US005144982A

United States Patent [19]

Willbanks

[11] Patent Number: 5,144,982

[45] Date of Patent: Sep. 8, 1992

[54] ELECTRO-PNEUMATIC VALVE CARD ASSEMBLIES

[75] Inventor: Charles E. Willbanks, Spartanburg, S.C.

[73] Assignee: Milliken Research Corporation, Spartanburg, S.C.

[21] Appl. No.: 819,599

[22] Filed: Jan. 9, 1992

Related U.S. Application Data

[63] Continuation of Ser. No. 596,803, Oct. 12, 1990, abandoned.

[51] Int. Cl.[5] ........................ F16K 11/00; F16K 31/08

[52] U.S. Cl. ............................ 137/625.5; 137/625.65; 137/883; 137/884; 251/65; 251/129.1; 251/129.16; 251/129.21

[58] Field of Search ................ 137/625.5, 625.65, 884, 137/883; 251/65, 129.1, 129.21, 129.16

[56] References Cited

U.S. PATENT DOCUMENTS 2,983,278 5/1961 Heintz .......................... 251/129.1 X
3,203,447 8/1965 Bremner et al. .................... 137/595
3,332,045 7/1967 Rodaway ..................... 251/129.1 X
3,383,084 5/1968 Mayfield ...................... 251/129.1 X
3,809,123 5/1974 Heimann .......................... 137/625.5
4,114,648 9/1978 Nakajima et al. .......... 137/625.65 X
4,116,676 9/1978 Varner .................................... 8/149
4,242,116 12/1980 Aschberger et al. ................ 62/199
4,306,589 12/1981 Harned et al. ................. 137/625.65
4,322,057 3/1982 Yamanaka et al. ................. 251/129
4,344,449 8/1982 Meyer ........................ 251/129.01 X
4,481,389 11/1984 Johnson ........................... 200/84 C
4,549,248 10/1985 Stoll .................................... 361/400
4,585,209 4/1986 Aine et al. ...................... 251/129.02
4,621,660 11/1986 Klocke ........................... 137/625.44
4,628,576 12/1986 Giachino et al. .
4,641,118 2/1987 Hirose et al. ........................ 335/282
4,647,013 3/1987 Giachino et al. .................. 251/331
4,658,162 4/1987 Koyama et al. .................. 310/68 R
4,690,371 9/1987 Bosley et al. ......................... 251/65
4,695,482 9/1987 Weiswurm ............................ 427/96
4,723,575 2/1988 Kazita et al. ........................ 137/883
4,826,131 5/1989 Mikkor .......................... 251/129.17

FOREIGN PATENT DOCUMENTS 0116683 8/1984 European Pat. Off. .
2739085 3/1979 Fed. Rep. of Germany ........................ 251/129.21
2842682 4/1980 Fed. Rep. of Germany .
3526166 1/1986 Fed. Rep. of Germany .
2079412 1/1982 United Kingdom ............. 251/129.1
2190983 12/1987 United Kingdom .

*Primary Examiner*—Gerald A. Michalsky
*Attorney, Agent, or Firm*—Kevin M. Kercher; H. William Petry

[57] ABSTRACT

An electro-pneumatic valve which includes a spiral coil formed of electrically conductive material bonded to an insulative substrate. A second layer of substrate material is mounted substantially beneath the combination of the spiral coil and insulative substrate. The second layer of substrate has both a recess and an outer edge. There is a first passage communicating between the recess and the outer edge. Within the recess is a magnetic armature that is operatively aligned with the spiral coil. There is a second passage communicating between the spiral coil and the recess. The magnetic armature moves in response to electric current passing through the spiral coil to close the second passage.

32 Claims, 5 Drawing Sheets

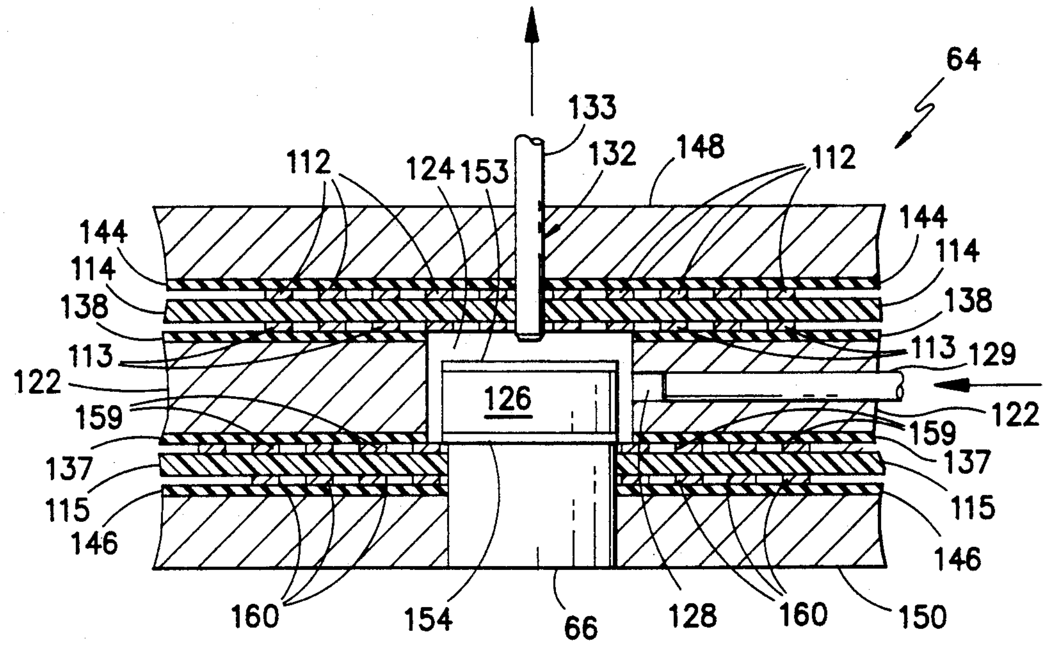
FIG. –5–
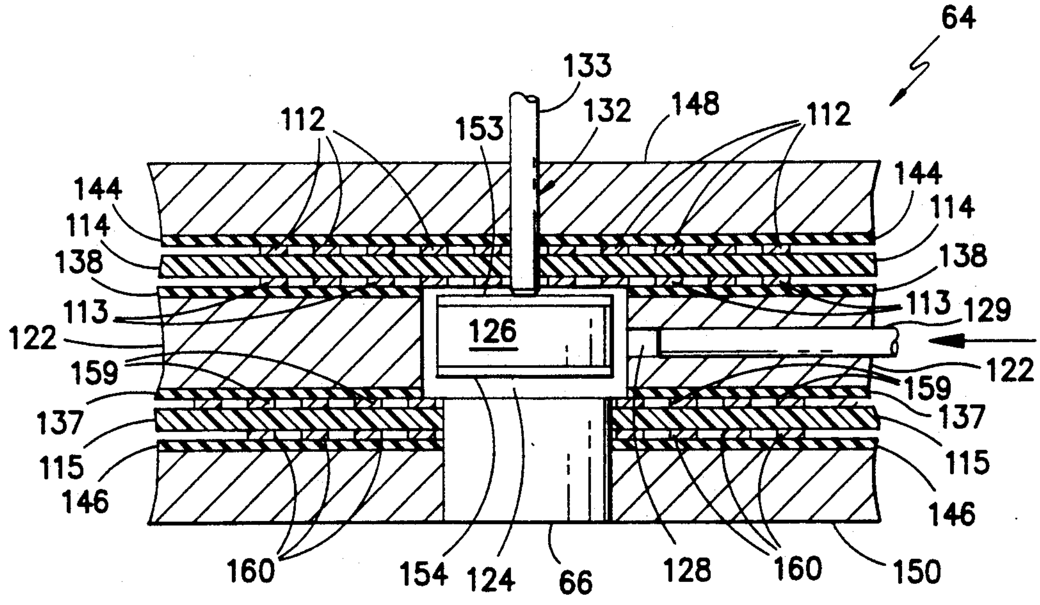
FIG. –6–

ELECTRO-PNEUMATIC VALVE CARD ASSEMBLIES

This application is a continuation of application Ser. No. 07/596,803, filed Oct. 12, 1990, now abandoned.

BACKGROUND OF THE INVENTION

This invention relates to an electro-pneumatic valve. In particular, in a preferred embodiment, this invention is directed to an electro-pneumatic valve card that uses a plurality of electromagnetic coils formed on a printed circuit board.

Electro-pneumatic valves are in widespread use in many applications in which gas streams are selectively controlled by electrical signals. One such application involves the patterning of textile substrates using various fluids. In one specific example, as set forth in U.S. Pat. No. 4,116,626, a substrate is contacted by a marking fluid controlled by an electro-pneumatic valve assembly, is made to contact the substrate at the desired location in accordance with electrically encoded patterning information. This valve assembly is associated with, and controls the flow of, a single stream of patterning fluid. In the apparatus contemplated in this example, multiple streams or jets of fluid, exiting from closely spaced orifices along the length of the manifold or patterning array that extends across the full width of a web of material, are required to achieve patterns having the desired high degree of detail.

One of the problems with precision valves currently marketed is the immense space requirements required when creating intricate patterns such as disclosed in U.S. Pat. No. 3,203,447. The present invention solves this problem in a manner not disclosed in the known prior art.

SUMMARY OF THE INVENTION

This invention is directed to an electro-pneumatic valve assembly which comprises a coil, a substrate having a recess and an outer edge in which said substrate is positioned below said coil. There is a magnetic member located within said recess. There is a first passage communicating between said recess and said outer edge and a second passage communicating between said first coil through to said recess and a means for applying an electric current to said coil to move said magnetic member to close said second passage.

An advantage of this invention is the ability to pack a relatively large number of fluid jets within a relatively short amount of space.

Another advantage of this invention is that multiple valves can be accommodated on a single printed board. The use of a copper plated circuit board results in relatively high electrical efficiency and capacity to dissipate heat. Furthermore, two congruent coils can be placed on opposite sides of the circuit board and electrically connected at the center by means of a plated hole through the circuit board with the magnetic field generated by its congruent counterpart, thereby yielding greater electromagnetic efficiency and enhanced performance.

Still another advantage is ability to replace valve cards for ease of maintenance with a simplified structure for facilitating repair as well use of multiple valves and coils on a single circuit board.

These and other advantages will be in part obvious and in part pointed out below.

BRIEF DESCRIPTION OF THE DRAWINGS

The above as well as other advantages of the invention will become more apparent from the following detailed description of the preferred embodiments of the invention, which when taken together with the accompanying drawings, in which:

FIGS. 5 and 6 represent cross sectional views of a second embodiment of an electro-pneumatic valve constructed in accordance with the present invention;

DETAILED DESCRIPTION OF THE PREFERRED EMBODIMENT

Figure 1:
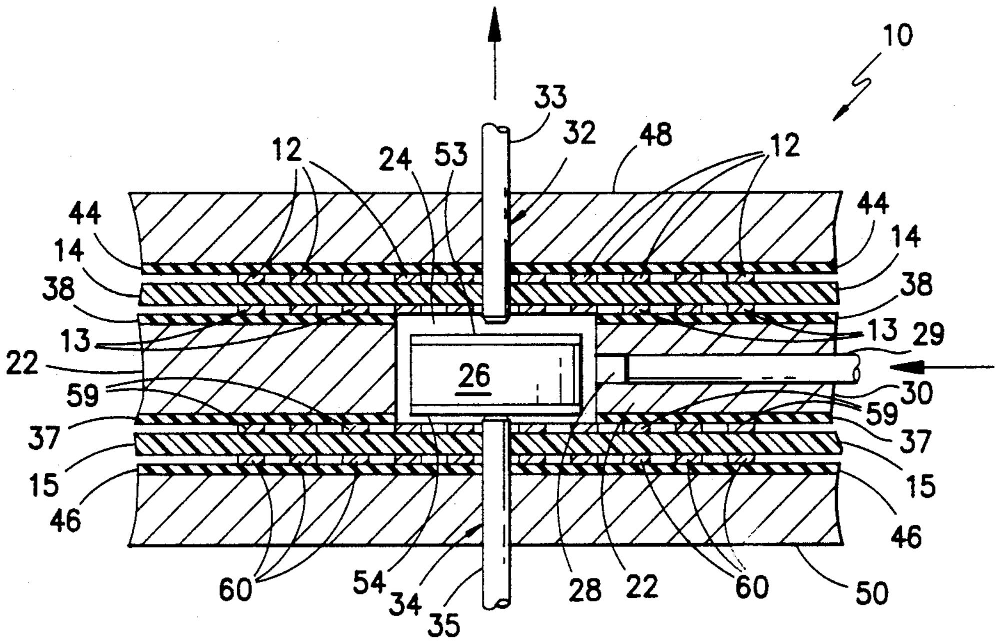
FIGS. 1 and 2 represent cross sectional views of a first embodiment of an electro-pneumatic valve constructed in accordance with the present invention.
Figure 2:
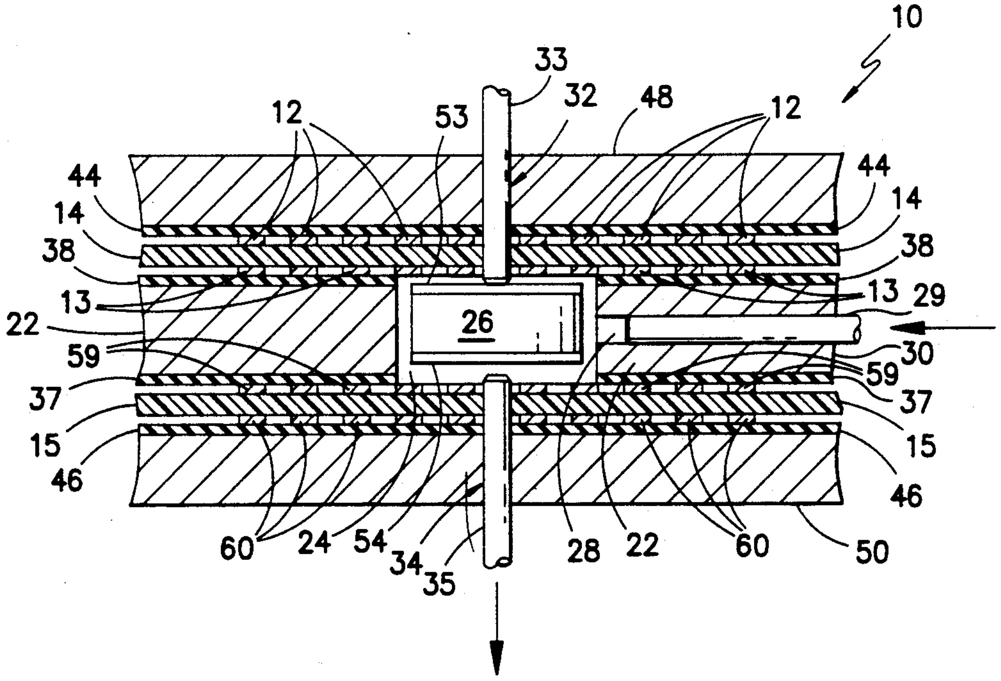
Figure 3:
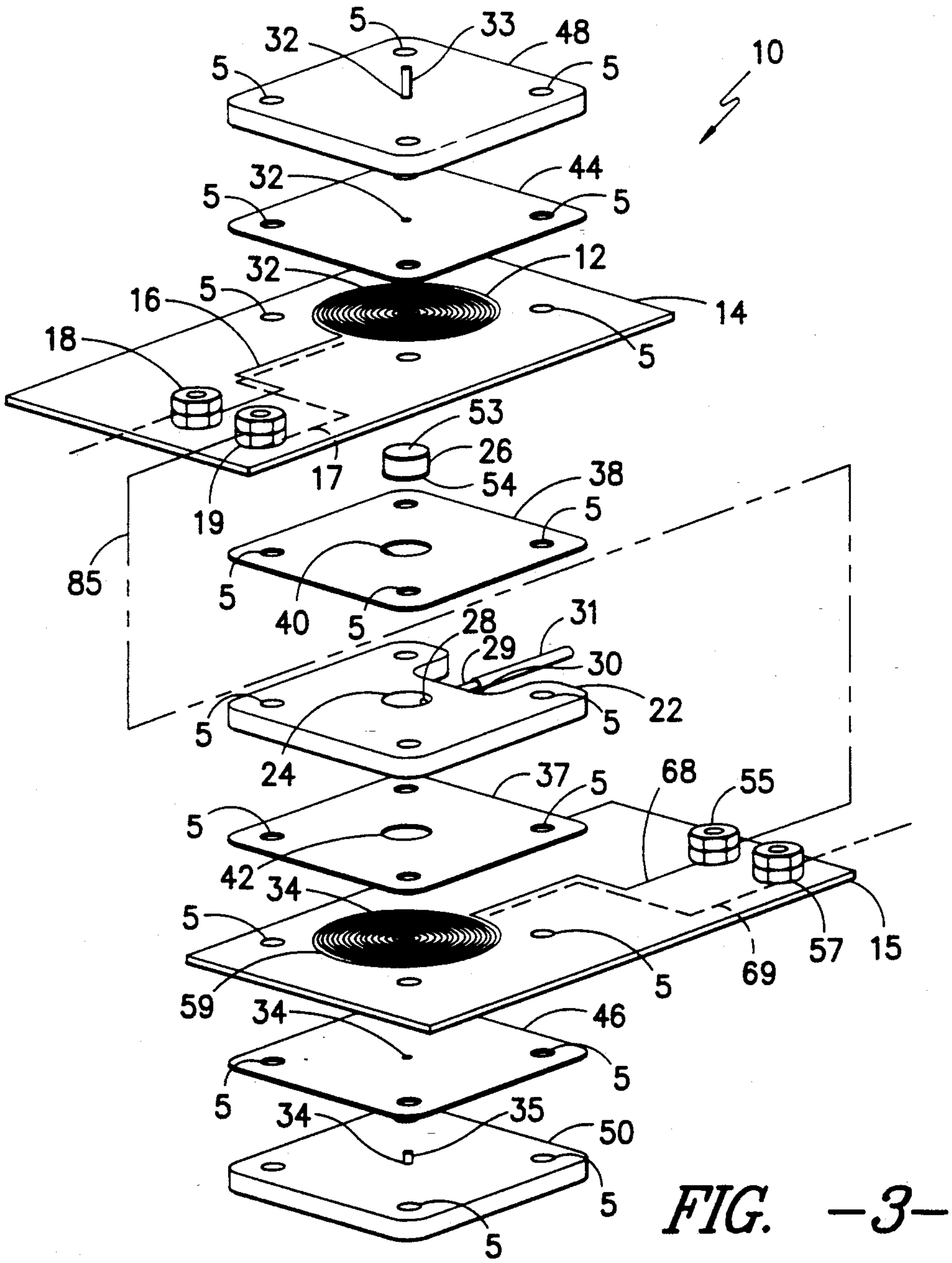
FIG. 3 represents an exploded perspective view of a valve card assembly incorporating the valve of the kind shown in FIGS. 1 and 2.
Figure 4:
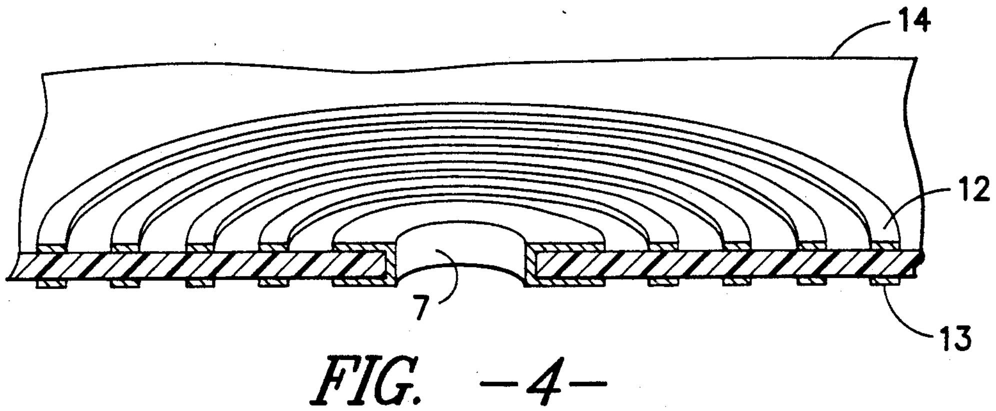
FIG. 4 is a cross-sectional perspective view of a printed circuit board carrying a pair of congruent coils configured in accordance with the present invention.

Referring now by reference numerals to the drawings and first to FIGS. 1–4 it will be understood that the electro-pneumatic valve generally indicated as 10, in the embodiment shown, consists of two electrically conductive spiral coils 12 and 13 mounted on opposite sides of a printed circuit board 14. The circuit board 14 consists of a nonconductive electrically insulative substrate. The electrically conductive spiral coil 12, 13 is manufactured, for example, by a photo-etching process. This involves bonding a copper foil to the surface of the insulative substrate 14 and then sketching a spiral pattern on the copper foil. Subsequently, an etching solution is applied to the surface of the copper foil to etch the surface which leaves the patterned lines while removing all other copper foil. In combination, these two coils 12 and 13 on opposite sides of a circuit board, respectively, create a much greater magnetic force then would one coil alone. These coils 12 and 13 are connected by means of an electrical interconnection 7 which comprises a plated hole that is engaging the coils 12, 13 as shown in FIG. 4. There is an electrical connecting lead 16 located on the upper surface of circuit board 14, as shown in FIG. 3, which extends from coil 12 to a terminal 18 near the outer edge of the circuit board 14. There is another electrical connecting lead 17 located on the lower surface of circuit board 14 that extends from coil 13 to a terminal 19 which is also near the outer edge of circuit board 14. Both terminal 18 and terminal 19 extend upward from the upper surface of circuit board 14.

There is a second circuit board 15 that is configured in the exactly the same manner as circuit board 14. Circuit board 15 also has two coils 59, 60 located on opposite sides of the board as shown in FIGS. 1, 2, and 3. There are also two connecting leads 68, 69 on opposite sides of board 15 extending to terminals 55 and 57 respectively.

A layer of substrate material 22 is interposed between circuit board 14 and 15. This layer of substrate is formed from any nonmagnetic-type material but is preferably constructed out of aluminum or plastic. Circular recess 24 is centered between coil 13 and coil 59. Within this recess 24 is a permanent magnet armature 26 that is constructed of aluminum nickel cobalt or any of many permanent magnet alloys. The strength of the permanent magnet directly relates to the valve switching time as well as to the valve cutoff response.

Inlet passage 28 extends from the substrate recess 24 to an outer edge 30 of the substrate material 22 as shown in FIGS. 1, 2, and 3. Within the inlet passage 28 is a capillary tube 29 that is constructed of stainless steel or some other type of nonmagnetic material. A rubber hose 31 attaches over the end of the capillary tube 29 in sealed relation which results in a means of providing fluid to the valve assembly 10. The hose 31 can also be constructed out of plastic or other fluid sealing material.

Inner gaskets 38 and 37 form a seal between the substrate material 22 and upper spiral coil 59 and lower spiral coil 13 respectively. There is an optional recess 40 and 42 that corresponds to the perimeter of substrate recess 24. Furthermore, a pair of outer gaskets 44 and 46 are interposed between circuit boards 14 and 15 and a pair of cover plates 48 and 50 respectively as shown in FIG. 3. The gaskets 37, 38, 44 and 46 are constructed of latex rubber or some similar fluid sealing material. The cover plates 48, 50 are constructed of aluminum or plastic or any other analogous nonmagnetic material.

There are two outlet passages 32, 34 that permit fluid to leave the substrate recess 24. Outlet passage 32 extends upward from the center of the recess 24 through the center of coil 12 and coil 13 on circuit board 14, and then through gasket 44 and finally cover plate 48 by means of top passage capillary tube 33. Outlet passage 34 extends downward from the center of the recess 24 through the center of coil 59 and coil 60 on circuit board 15, and then through gasket 46 and finally cover plate 50 by means of bottom passage capillary tube 35.

A rubber latex sealing means 53 overlaps the top of armature 26 and rubber latex sealing means 54 overlaps the bottom of armature 26 to provide a solid seal depending on whether the armature is adjacent the upper outlet passage 32 or the lower outlet passage 34. In the alternative, an equivalent arrangement would consist of the innermost ends of both the top outlet passage capillary tube 33 and the bottom outlet passage capillary tube 35 that come in contact with magnetic armature 26 being coated with latex rubber.

It is thought that the structural features and functional advantages of this bistable electro-pneumatic valve have become fully apparent from the foregoing description of parts but for completeness of disclosure, the operation of the assembly will be briefly described.

As clearly shown in FIG. 3, a dc voltage between 4 and 24 volts is applied to terminals 18 and 19 with the optimal voltage value being 12 volts. These values can vary depending on the interaction of the permanent and electromagnetic fields. This relates to time, current, conductor size, conductor material, conductor temperature, and so forth. This establishes a magnetic field in coils 12 and 13 that are located on opposite sides of circuit board 14. The same dc voltage should be applied to terminals 55 and 57 on circuit board 15 to generate a magnetic field in coils 59, 60 of board 15 that corresponds exactly to coils 12 and 13. It would be convenient to connect terminals 55 and 19 by electrical connection 85, as shown in FIG. 3, so that a single power source may be used. This creates a bistable effect in which the magnetic aperture 26 is simultaneously repelled by one set of coils and attracted by the other set. Therefore, when fluid is pumped through inlet passage 28 and the positive terminal of a dc voltage supply of 12 volts is electrically connected to terminal 18 and terminal 19 is electrically connected to terminal 55 and the negative terminal of the dc voltage supply is electrically connected to terminal 57, then the magnetic armature 26 will be repulsed by the upper coil combination 12 and 13 and attracted to the lower coil combination 59 and 60 as shown in FIG. 1. The fluid will flow into the inlet passage 28 and through recess 24 and out through the top outlet passage 32. The magnetic armature 26 with associated lower rubber sealing means 54 presses against the bottom outlet pipette 35 to prevent fluid flow.

When the voltage is reversed, then the negative terminal of the dc voltage supply is connected to terminal 18 and the positive terminal of the dc voltage supply is connected to terminal 57. The upper rubber sealing layer 53 will then press against the top outlet passage 32, as shown in FIG. 2. The fluid then flows from inlet passage 28 through the recess 24 and out of the bottom passage 34. The entire assembly 10 may be connected by means of conventional hardware (i.e., nuts and bolts) through four bolt holes 5 that are on each corner of each layer of the assembly.

An alternative embodiment of the electro-pneumatic valve indicated by numeral 64 is shown in FIGS. 5 and 6. In the alternative, similar components are indicated by the same numerals as described above with the addition of the prefix 1.

The electro-pneumatic valve 64 also has four coils 112, 113, 159 and 160. Circuit board 114 has coils 112 and 113 on opposite sides thereof as does circuit board 115 with coils 159 and 160. The substrate 122, gaskets 138, 144, 137, 146 and cover plates 148 and 150 are identical with the previous embodiment. The only modification is that the bottom outlet passage is removed and an iron keeper 66 is attached that is cylindrical and has the same basic circumference as the magnetic armature 126. The iron keeper 66 extends through the lower cover plate 150, cover plate gasket 146, coil 160, 159, circuit board 115, lower inner gasket 137, and substrate 122. The iron keeper 66 is constructed of powdered iron or any similar ferrous material such as nickel, steel, and so forth. When no voltage is applied to the coils, the fluid comes into the valve through inlet passage 128 by means of capillary tube 129 through recess 124 and then out through the upper outlet passage 132 by means of capillary tube 133.

The magnetic armature 126 is held to the iron keeper 66 by magnetic attraction as shown in FIG. 5. When a dc voltage is applied to coils so that coils 112 and 113 attract magnetic armature 126 while coils 159 and 159 simultaneously repulse magnetic armature 126, then the fluid is blocked as shown in FIG. 6. This occurs when the upper rubber sealing means 153 of the magnetic armature 126 is forced against the upper outlet passage 132. The fluid then enters the recess 124 and has nowhere to exit.

Figure 7:
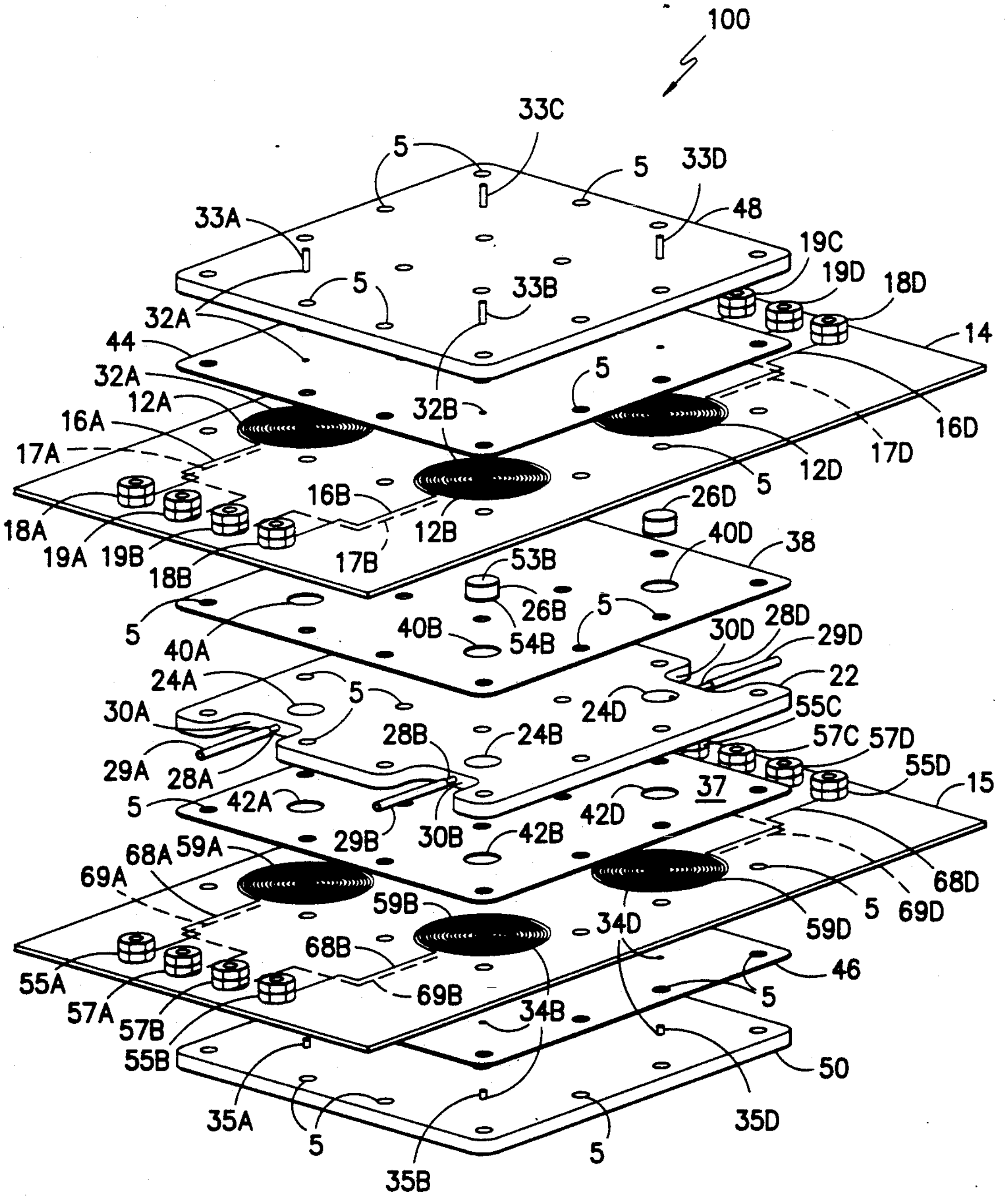
FIG. 7 represents an exploded perspective view of a valve card assembly incorporating four valves of the kind shown in FIGS. 1 and 2.

Another alternative embodiment is shown in FIG. 7 in which four separate electro-pneumatic valves are utilizing the same substrate indicated generally as 100. In the alternative embodiment, similar components to FIG. 3 are symbolized by the same numeral. The suffixes A, B, C, and D are used to denote which one of the four valves is being referenced. There is an upper circuit board 14 with four coils 12A, 12B, 12C, and 12D mounted above the board and four coils 13A, 13B, 13C, and 13D positioned directly underneath and below board 14 in the same manner as FIGS. 1, 2 and 4. The same situation occurs on the lower circuit board 15 with coils 59A, 59B, 59C, 59D, 60A, 60B, 60C, and 60D. Four sets of dual terminals 18A, 18B, 18C, 18D, 19A, 19B, 19C, and 19D are located on the upper circuit board 14 with associated wiring 17A, 17B, 17C, 17D, 16A, 16B, 16C, and 16D as well as four sets of dual terminals 55A, 55B, 55C, 55D, 57A, 57B, 57C, and 57D which are located on the lower circuit board in association with wiring 68A, 68B, 68C, 68D, 69A, 69B, 69C, and 69D. There are also four recesses 24A, 24B, 24C, and 24D with associated magnetic armatures 26A, 26B, 26C, and 26D that each have an upper sealing means 53A, 53B, 53C and 53D and a lower sealing means 54A, 54B, 54C, and 54D. There are also four individual inlet passages 28A, 28B, 28C, and 28D which extends from the edge of the substrate 22 at 30A, 30B, 30C, and 30D by means of associated capillary tubes 29A, 29B, 29C, and 29D as well as four upper and lower outlet passages 32A, 32B, 32C, and 32D and 34A, 34B, 34C, and 34D as well as associated capillary tubes 33A, 33B, 33C, 33D, 35A, 35B, 35C, and 35D. There is also an upper cover plate 48 and a lower cover plate 50 overlying outer gaskets 44 and 46 respectively. The upper and lower inner gasket 38 and 37 each have four apertures 40A, 40B, 40C, 40D and 42A, 42B, 42C, and 42D respectively which is the same circumference as recess 24A, 24B, 24C, and 24D. Each valve can be individually controlled. The entire structure is bolted together by conventional hardware utilizing bolt holes 5.

Figure 8:
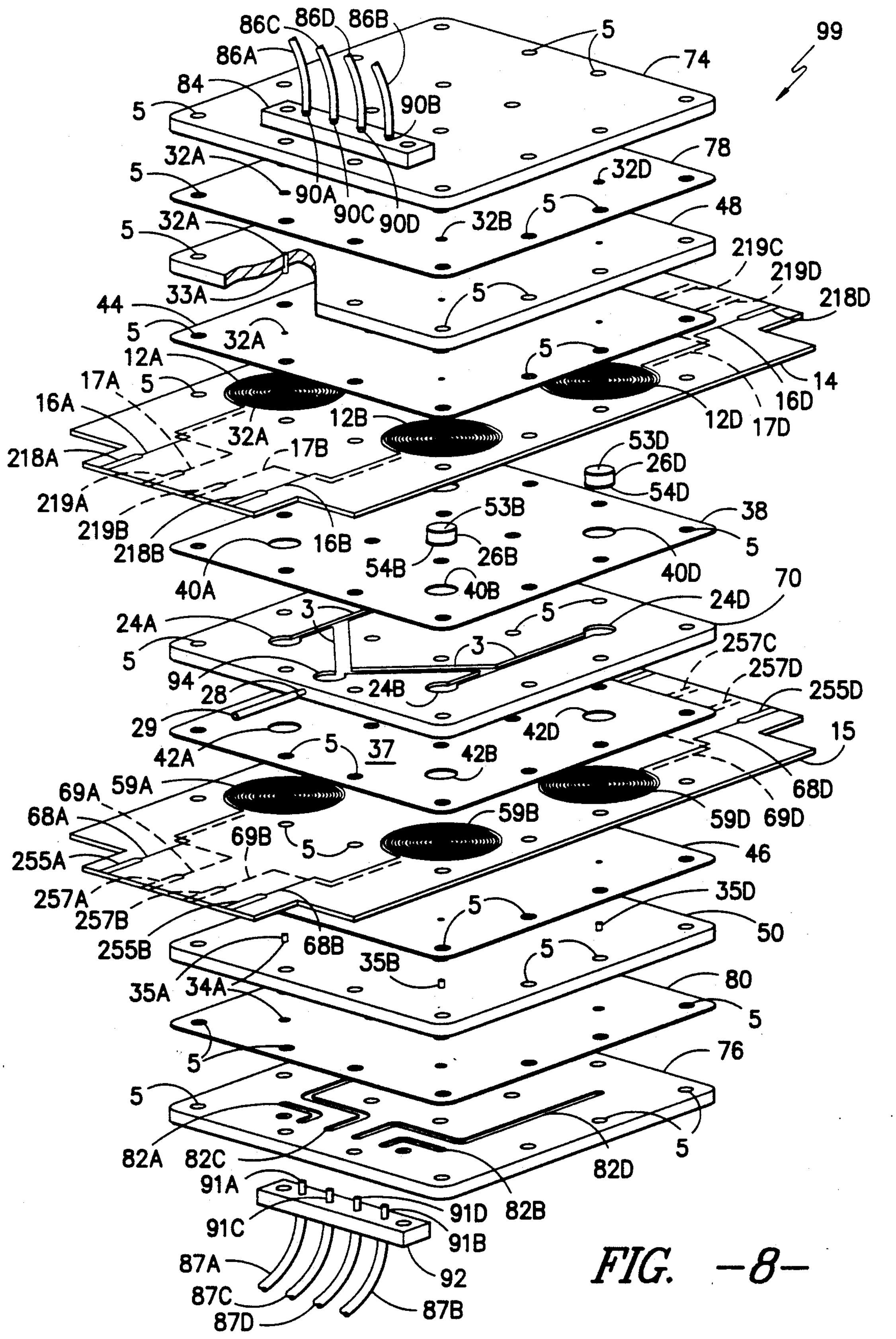
FIG. 8 represents an exploded perspective view of an alternative embodiment of a valve card assembly incorporating four valves of the kind shown in FIGS. 1 and 2 with a solitary input means.

Another alternative embodiment generally indicated at numeral 99, as shown in FIG. 8, in which four separate electro-pneumatic valves are utilizing the same inlet passage 28. In the alternative embodiment, similar components to FIG. 7 are symbolized with the same numeral. There is an upper circuit board 14 with four coils 12A, 12B, 12C, and 12D mounted above the board 14 and four coils 13A, 13B, 13C, and 13D positioned directly underneath board 14 and in the same manner as shown in FIGS. 1, 2, 4 and 5. The same situation occurs on the lower circuit board 15 with coils 59A, 59B, 59C, 59D, 60A, 60B, 60C, and 60D. Four dual sets of copper strip terminal connectors 218A, 218B, 218C, 218D, 219A, 219B, 219C, and 219D are located on the upper circuit board 14 and four sets of terminals 255A, 255B, 255C, 255D, 256A, 256B, 256C, and 256D are located on the lower circuit board 15. All four valves utilize the same substrate 70 which has connecting passageways 3 which interconnect recesses 24A, 24B, 24C, and 24D. Distribution plates 74 and 76 are placed over both the upper cover plate 48 and the lower cover plate 50 respectively. There is also an additional upper gasket 78 made of latex rubber which is interposed between cover plate 48 and upper distribution plate 74. There is also a lower additional gasket 80 made of latex rubber which is interposed between cover plate 50 and lower distribution plate 76. Recessed channels 82A, 82B, 82C, and 82D are located on the surface of the distribution plate 76. There is also identical recessed channels in distribution plate 74. Fluid leaves the distribution plates 74 and 76 by means of a dual sets of four latex rubber fluid tubes 86A, 86B, 86C, and 86D for distribution plate 74 and 87A, 87B, 87C, and 87D for distribution plate 76 which are held in position by mounting bridges 84 and 92 respectively. Fluid tubes 86A, 86B, 86C, 86D, 87A, 87B, 87C, and 87D communicates with and are hermetically sealed in relation to the recessed channels so that fluid flows within the inner face of distribution plates 74 and 76 and the upper and lower additional gaskets 78 and 80. The fluid enters the recessed channels from the top and bottom outlet capillary tubes 33A, 33B, 33C, 33D and 35A, 35B, 35C, and 35D which are extending in perpendicular relation to the upper and lower cover plates 48 and 50 as in FIG. 7. There is a solitary inlet passage 28 that communicates from the outer edge of the substrate 70 by means of capillary tube 29 to the central recess 94. Therefore, the inlet fluid is common to all four valves. Fluid enters inlet passage 28 and into recess 94 and is then distributed by means of connecting passageways 3 into recesses 24A, 24B, 24C, and 24D. Then, depending on the position of each magnetic armature 26A, 26B, 26C, and 26D which has an associated upper and lower rubber sealing means 53A, 53B, 53C, 53D, 54A, 54B, 54C, and 54D, the fluid is diverted into either upper outlet passage 32A, 32B, 32C, and 32D or lower outlet passage 34A, 34B, 34C, and 34D. These outlet passages connect to the recessed channels such as 82A, 82B, 82C, and 82D for distribution plate 76. Fluid then flows out of capillary tubes 90A, 90B, 90C, 90D and latex rubber fluid tubes 86A, 86B, 86C, 86D for distribution plate 74 and capillary tubes 91A, 91B, 91C, and 91D and latex rubber fluid tubes 87A, 87B, 87C, and 87D for distribution plate 76.

The electro-pneumatic operation of the valves in this card is as previously described. The terminals 218A, 218B, 218C, and 218D and 219A, 219B, 219C, and 219D as well as 255A, 255B, 255C, and 255D and 257A, 257B, 257C, and 257D for each valve are now copper etched strips that reside in the same side of the current board 14, 15 as the respective electric connection 16, 17, 18, and 19 adapt to a female circuit board connector. As before, there are numerous vertically aligned holes 5 to connect the various layers by means of conventional hardware (i.e., nuts and bolts) as well as gaskets 44, 38, 37, and 46 with the inner gaskets 38 and 37 having recesses 40A, 40B, 40C, 40D and 42A, 42B, 42C, and 42D respectively which conform to the circumference of magnetic armature 26A, 26B, 26C, and 26D. Another factor to consider is that superconductive material may be used instead of the copper etched strips. This will greatly increase the magnetic force of the coil as well as lessen space and current requirements. Since superconductive material and standard conductive material can look substantially the same, Coils 12, 13, 59 and 60 shown in FIGS. 1 through 8 also function to visually demonstrate the use of superconductive material.

In view of the above, it will be seen that various aspects and features of the invention are achieved and other advantageous results attained. While a preferred embodiment of the invention has been shown and described, it will be clear to those skilled in the art that changes and modifications may be made therein without departure from the invention in its broader aspect.

What is claimed is:

1. An electro-pneumatic valve assembly which comprises:

(a) an electrically conductive substantially flat spiral coil;

(b) a substantially flat substrate having a recess and an outer edge in which said substrate is positioned below said coil;

(d) a magnetic member located within said recess;

(e) a first passage communicating between said recess and said outer edge;

(f) a second passage communicating between said coil through to said recess; and (g) a means for applying an electric current to said coil to move said magnetic member toward said coil to close said second passage.

2. An electro-pneumatic valve assembly as defined in claim 1, in which said magnetic member is operatively aligned with said coil.

3. An electro-pneumatic valve assembly as defined in claim 1, in which said electric current is direct current.

4. An electro-pneumatic valve assembly as defined in claim 1, in which said first passage functions as a fluid inlet.

5. An electro-pneumatic valve assembly as defined in claim 1, in which said second passage functions as a fluid outlet.

6. An electro-pneumatic valve assembly as defined in claim 1, in which said coil is formed of superconductive material.

7. An electro-pneumatic valve assembly which comprises:

(a) a first electrically conductive substantially flat spiral coil;

(b) a second electrically conductive substantially flat spiral coil aligned in overlapping relation to said first coil;

(c) a substantially flat substrate having a recess and an outer edge in which said substrate is interposed between said first and second coils;

(d) a magnetic member located within said recess and interposed between said first coil and said second coil;

(e) a first passage communicating between said recess and said outer edge;

(f) a second passage communicating between said first coil through to said recess; and (g) a means for applying an electric current to said first coil and said second coil to move said magnetic member toward said first coil and for applying an electric current to said first coil and said second coil to move said magnetic member toward said second coil.

8. An electro-pneumatic valve assembly as defined in claim 7, wherein:

(h) a third passage is communicating between said second coil through to said recess; and 9. An electro-pneumatic valve assembly as defined in claim 8, in which said third passage is an outlet means.

10. An electro-pneumatic valve assembly as defined in claim 7, wherein said electric current is direct current.

11. An electro-pneumatic valve assembly as defined in claim 7, in which said first passage is an inlet means.

12. An electro-pneumatic valve assembly as defined in claim 7, in which said second passage is an outlet means.

13. An electro-pneumatic valve assembly as defined in claim 7, in which said first coil and said second coil are relatively congruent.

14. An electro-pneumatic valve assembly as defined in claim 7, in which said first and second coil are formed of superconductive material.

15. An electro-pneumatic valve assembly which comprises:

(a) a first set of a plurality of coils;

(b) a second set of a plurality of coils aligned in overlapping relation to said first set of coils;

(c) a substrate having a plurality of recesses and an outer edge in which said substrate is interposed between said first and second sets of coils;

(d) a plurality of magnetic members located within said recesses and interposed between said first set of coils and said second set of coils;

(e) a first set of a plurality of passages communicating between said recesses and said outer edge;

(f) a second set of a plurality of passages communicating between said first set of coils through to said recesses;

(g) a means for applying a electric current to said first set of coils and said second set of coils to move said magnetic members toward said first set of coils and for applying an electric current to said first set of coils and said second set of coils to move said magnetic members toward said second set of coils; and (h) a third set of a plurality of passages are communicating between said second set of coils through to said recesses.

16. An electro-pneumatic valve assembly as defined in claim 15, in which said recesses communicate with each other.

17. An electro-pneumatic valve assembly as defined in claim 15, in which said electric current is direct current.

18. An electro-pneumatic valve assembly as defined in claim 15, in which:

(i) a first cover plate is positioned over said first set of a plurality of coils; and (j) a second cover plate is positioned underneath said second set of a plurality of coils.

19. An electro-pneumatic valve assembly as defined in claim 15, in which said first set of a plurality of passages functions as an inlet.

20. An electro-pneumatic valve assembly as defined in claim 15, in which said first set of a plurality of passages comprises of a plurality of capillary tubes.

21. An electro-pneumatic valve assembly as defined in claim 15, in which said second set of a plurality of passages functions as an outlet.

22. An electro-pneumatic valve assembly as defined in claim 15, in which said third set of a plurality of passages functions as an outlet.

23. An electro-pneumatic valve assembly as defined in claim 15, in which said second set of a plurality of passages comprises of a plurality of capillary tubes.

24. An electro-pneumatic valve assembly as defined in claim 15, in which:

(i) said first set of a plurality of coils is operatively attached to a third substrate; and (j) said second set of a plurality of coils is operatively attached to a third substrate.

25. An electro-pneumatic valve assembly as defined in claim 24, in which:

(k) said second substrate is comprised of nonconductive circuit board material; and (l) said third substrate is comprised of nonconductive circuit board material.

26. An electro-pneumatic valve assembly as defined in claim 15, further comprising:

(i) a first gasket means interposed between said first set of a plurality of coils and said substrate; and (j) a second gasket means is interposed between said second set of a plurality of coils and said substrate.

27. An electro-pneumatic valve assembly as defined in claim 26, further comprising:
(k) the first gasket means has a plurality of apertures; and
(l) the second gasket means has a plurality of apertures.

28. An electro-pneumatic valve assembly as defined in claim 27, in which
each of said plurality of apertures of said first gasket means conform to the outer perimeter of each of the plurality of recesses in one-to-one correspondence; and
each of said plurality of apertures of said second gasket means conforms to the outer perimeter of each of the plurality of recesses in one-to-one correspondence;

29. An electro-pneumatic valve assembly which comprises:
(a) a first set of a plurality of coils;
(b) a second set of a plurality of coils aligned in overlapping relation to said first set of coils;
(c) a first substrate having a plurality of recesses and an outer edge in which said first substrate is interposed between said first set of a plurality of coils and said second set of a plurality of coils;
(d) a plurality of magnetic members located within said plurality of recesses in a one-to-one relationship and interposed between said first set of a plurality of coils and said second set of a plurality of coils;
(e) a first set of a plurality of passages communicating between said plurality of recesses and said outer edge;
(f) a second set of a plurality of passages communicating between said first set of a plurality of coils through to said plurality of recesses;
(g) a means for applying a direct current to said first set of a plurality of coils and said second set of a plurality of coils to move said plurality of magnetic members toward said first set of a plurality of coils and for applying a direct current to said first set of a plurality of coils and said second set of a plurality of coils to move said plurality of magnetic members toward said second set of a plurality of coils;
(h) a third set of a plurality of passages is communicating between said second set of a plurality of coils through to said plurality of recesses;
(i) said plurality of recesses communicates with each other;
(j) a first cover plate is positioned over said first set of a plurality of coils;
(k) a second cover plate is positioned underneath said second set of a plurality of coils;
(l) a first gasket means is interposed between said first set of a plurality of coils and said first substrate;
(m) a second gasket means is interposed between said second set of a plurality of coils and said first substrate;
(n) the first gasket means has a plurality of apertures;
(o) the second gasket means has a plurality of apertures;
(p) each of said plurality of apertures of said first gasket means conforms to the outer perimeters of each of said plurality of recesses;
(q) each of said plurality of apertures of said second gasket means conforms to the outer perimeters of each of said plurality of recesses in one-to-one correspondence;
(r) said first set of a plurality of coils is operatively attached to both sides of a second substrate, in aligned relation, which is composed of nonconductive circuit board material;
(s) said second set of a plurality of coils is operatively attached to both sides of a third substrate, in aligned relation, which is composed of nonconductive circuit board material;
(t) a third gasket means which is interposed between said second substrate and said first cover plate.

30. An electro-pneumatic valve assembly as defined in claim 29, in which there is an electrical interconnection between the aligned first set of a plurality of coils on each side of the second substrate and an electrical interconnection between the aligned second set of a plurality of coils on each side of the third substrate.

31. An electro-pneumatic valve assembly as defined in claim 29, further comprising:
(v) a third cover plate having a plurality of recesses which is operatively connected to said second set of a plurality of passages; and
(w) a fourth cover plate having a plurality of recesses which is operatively connected to said third set of a plurality of passages.

32. An electro-pneumatic valve assembly as defined in claim 31, further comprising:
(x) a first plurality of tubing mounted to said third cover plate and operative connected to said plurality of recesses of said third cover plate; and
(y) a second plurality of tubing mounted to said fourth cover plate and operatively connected to said plurality of recesses of said fourth cover plate.

* * * * *